Figure 1:
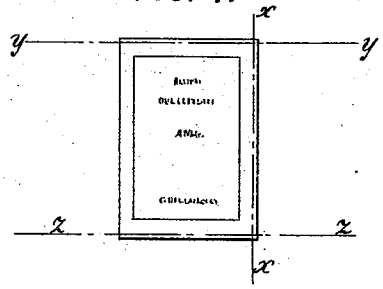

(No Model.) 7 Sheets—Sheet 1.

C. W. LOVELL & A. BREDENBERG.
BOOK TRIMMING MACHINE.

No. 490,877. Patented Jan. 31, 1893.

WITNESSES:
John Becker
Fred White

INVENTORS:
Charles W. Lovell and
Alfred Bredenberg,
BY
Arthur C. Fraser & Lee
ATTORNEYS.

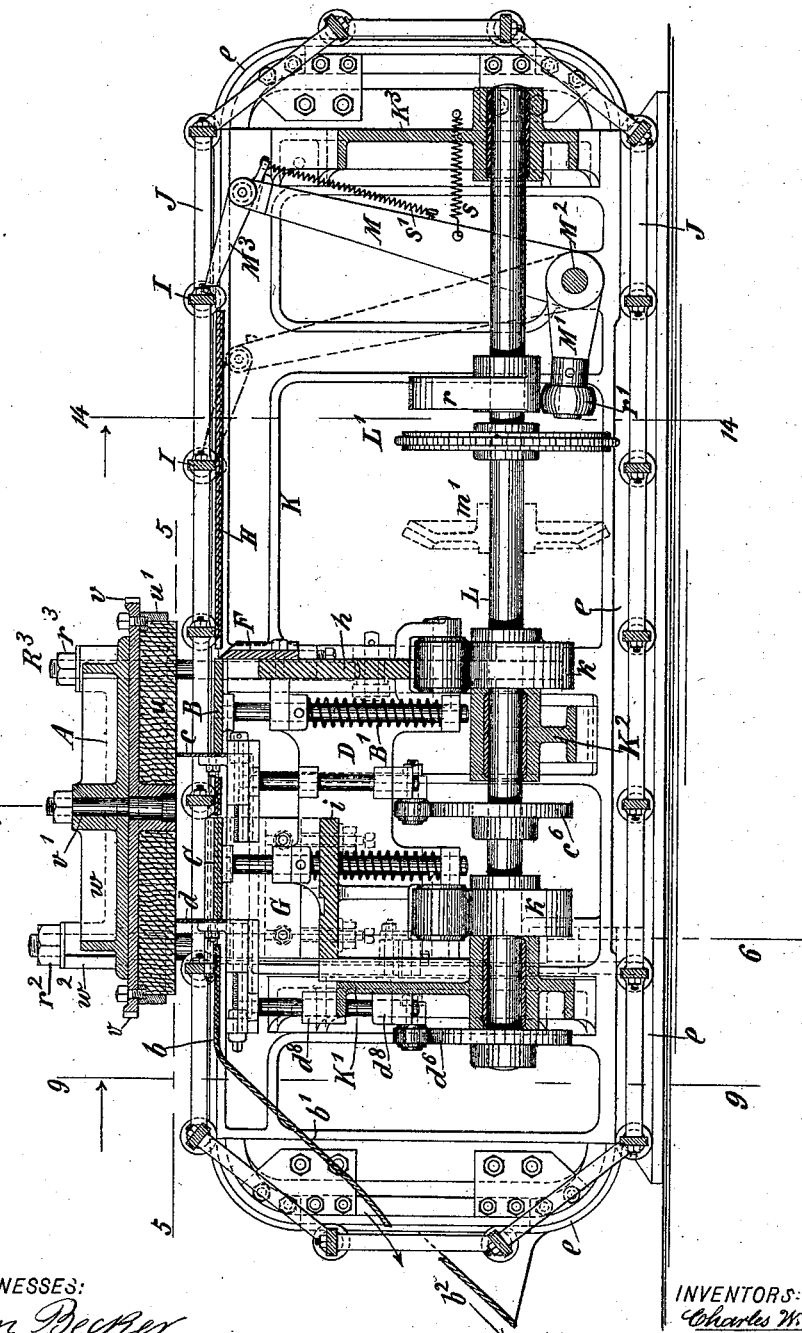

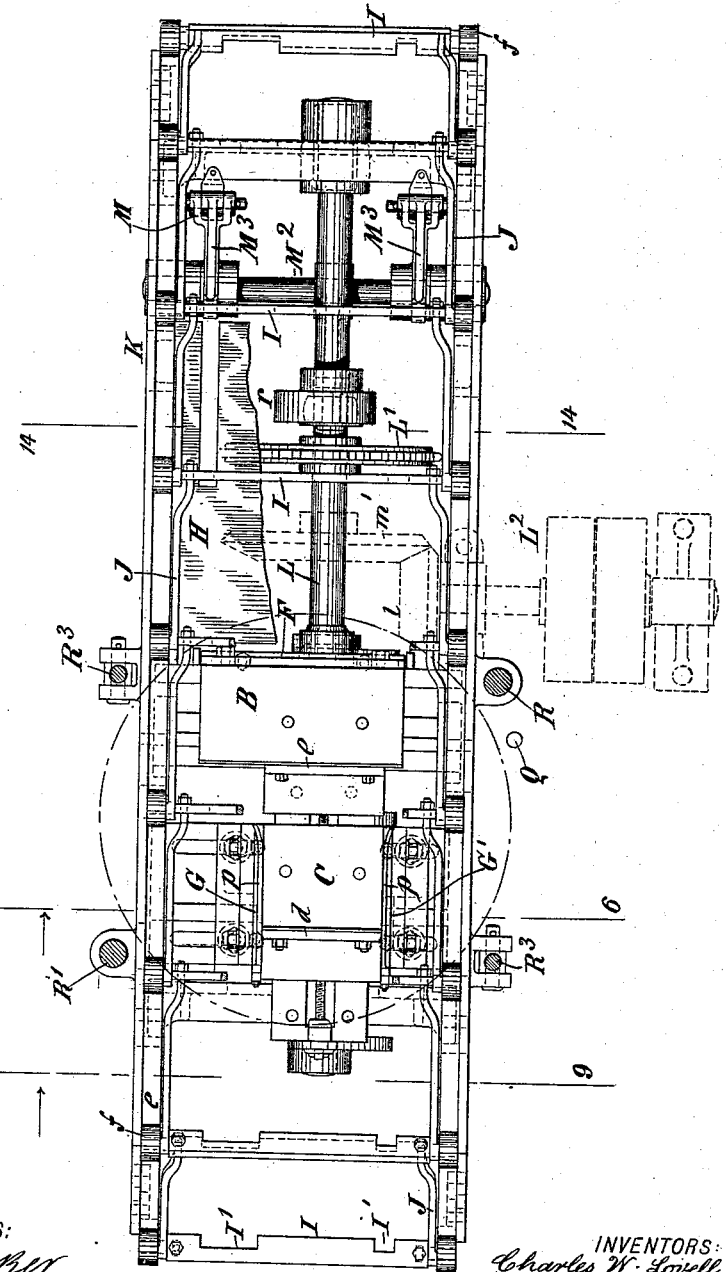

(No Model.) 7 Sheets—Sheet 4.
C. W. LOVELL & A. BREDENBERG.
BOOK TRIMMING MACHINE.
No. 490,877. Patented Jan. 31, 1893.
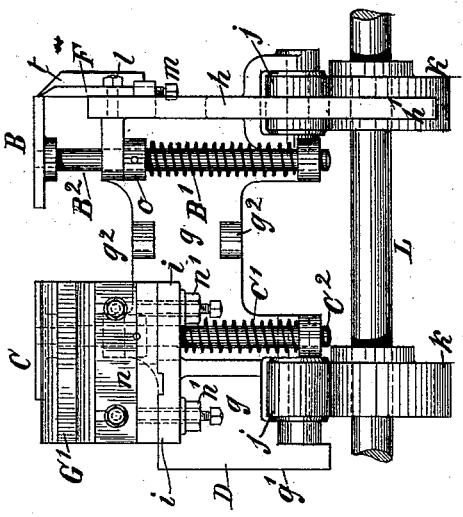
FIG. 7.
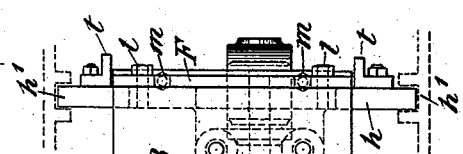
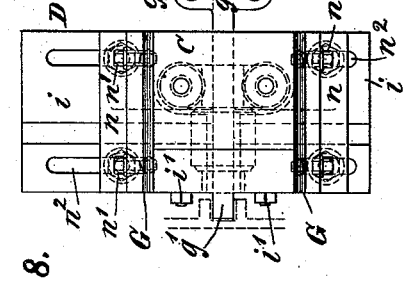
FIG. 8.
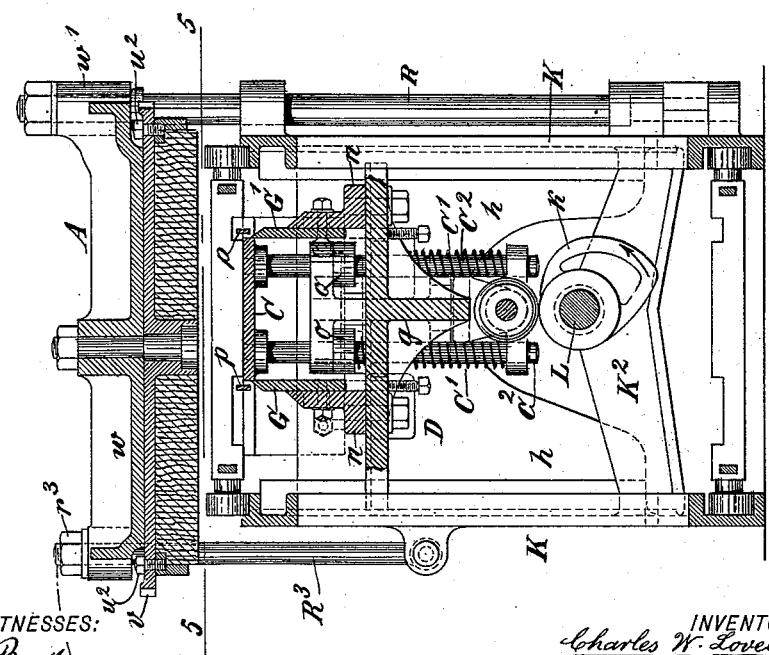
FIG. 6.
WITNESSES:
John Becker
Fred White
INVENTORS:
Charles W. Lovell and
Alfred Bredenberg,
BY
Arthur C. Fraser & Co.
ATTORNEYS.

(No Model.) 7 Sheets—Sheet 5.
C. W. LOVELL & A. BREDENBERG.
BOOK TRIMMING MACHINE.
No. 490,877. Patented Jan. 31, 1893.
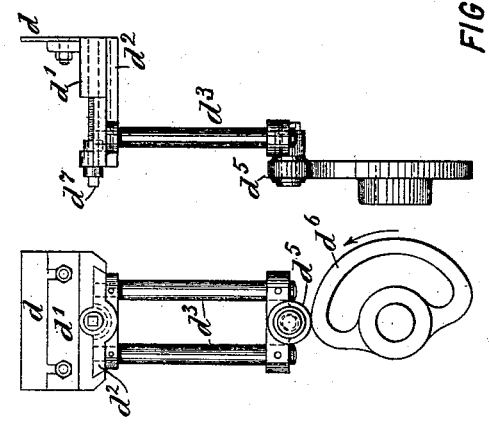
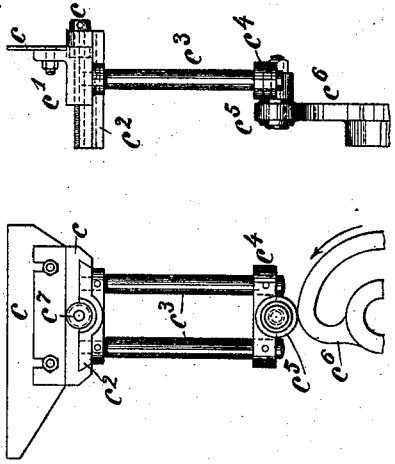
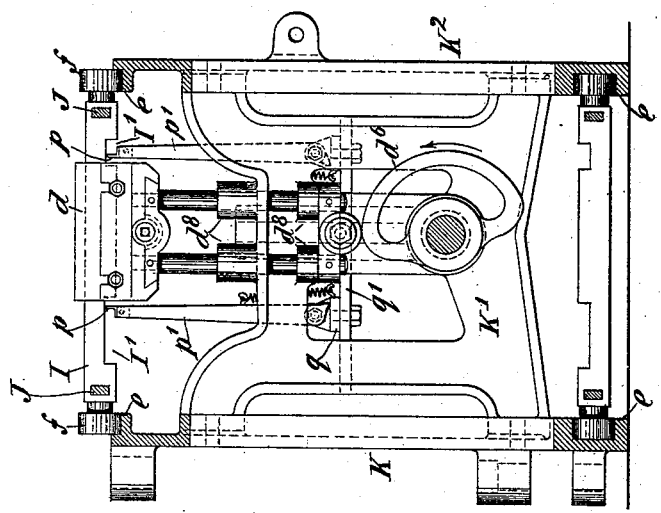

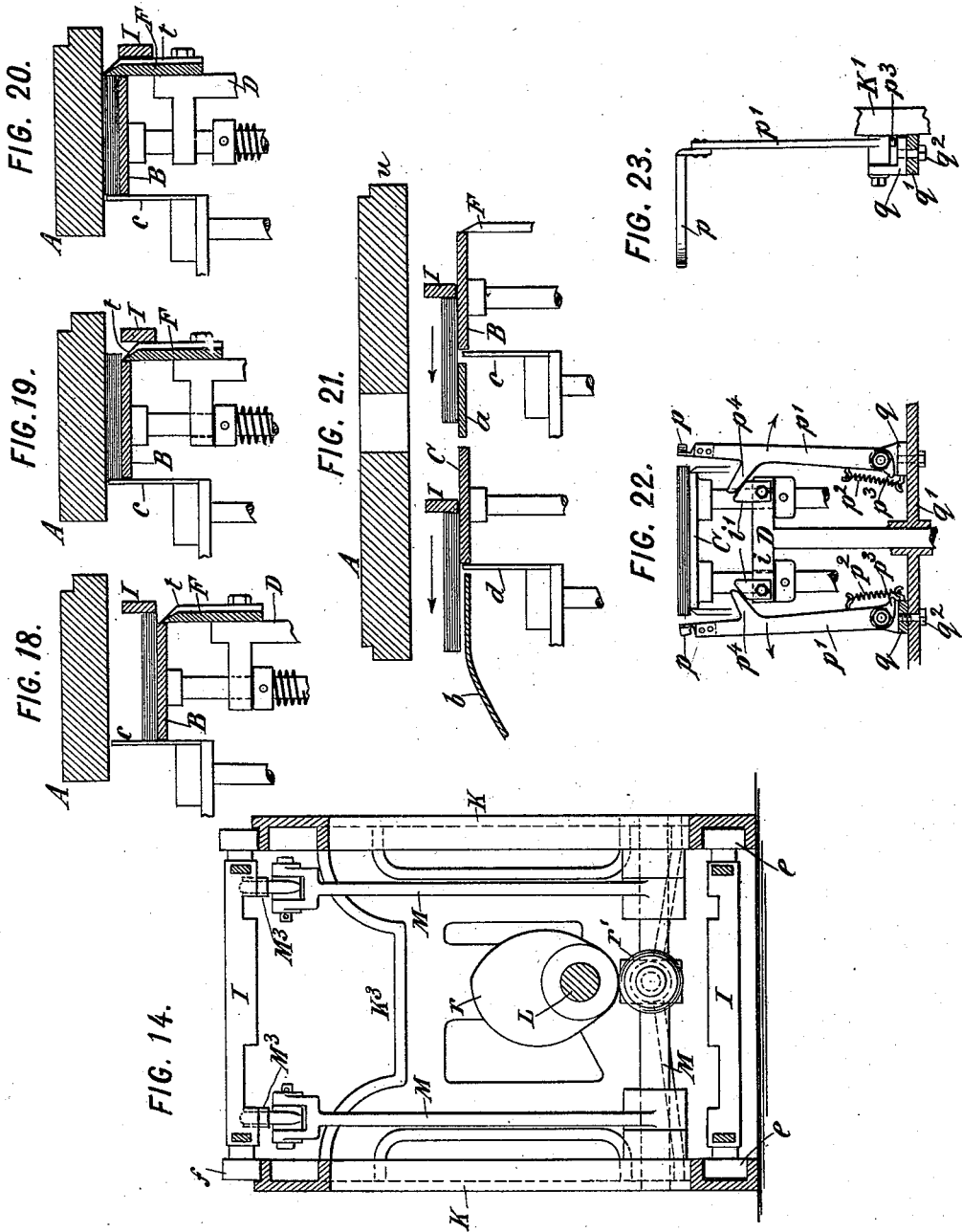

(No Model.) 7 Sheets—Sheet 7.
C. W. LOVELL & A. BREDENBERG.
BOOK TRIMMING MACHINE.
No. 490,877. Patented Jan. 31, 1893.
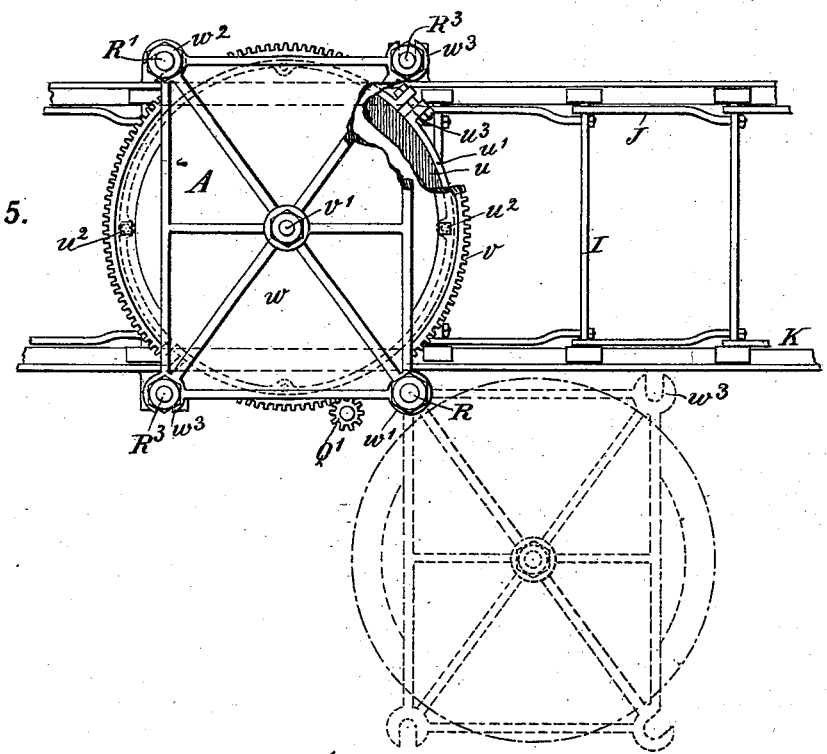
FIG. 15.
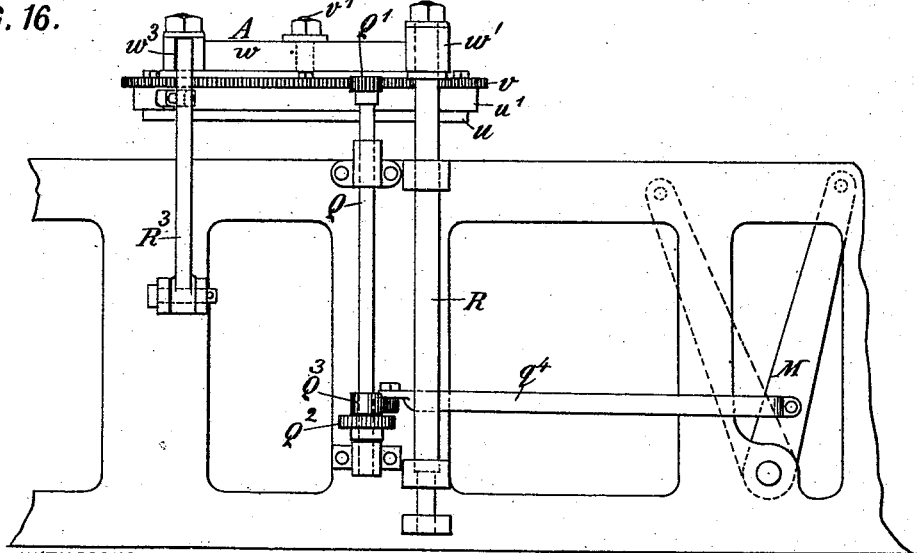
FIG. 16.
FIG. 17.
WITNESSES:
John Becker
Fred White
INVENTORS:
Charles W. Lovell and
Alfred Bredenberg,
BY
Arthur C. Fraser & Co
ATTORNEYS.

UNITED STATES PATENT OFFICE.

CHARLES W. LOVELL AND ALFRED BREDENBERG, OF BROOKLYN, ASSIGNORS OF ONE-THIRD TO JOHN W. LOVELL, OF NEW YORK, N. Y.

BOOK-TRIMMING MACHINE.

SPECIFICATION forming part of Letters Patent No. 490,877, dated January 31, 1893.

Application filed October 3, 1892. Serial No. 447,600. (No model.)

*To all whom it may concern:*

Be it known that we, CHARLES W. LOVELL and ALFRED BREDENBERG, both citizens of the United States, residing at Brooklyn, in the county of Kings and State of New York, have invented certain new and useful Improvements in Book-Trimming Machines, of which the following is a specification.

This invention relates to mechanism for cutting or trimming off the sides of books, magazines, pamphlets, &c. It is applicable to trimming paper covered books or pamphlets after binding, and to the trimming of the leaves of books to be bound in stiff covers, the trimming being performed before such covers are applied.

It is now customary in the manufacture of paper covered books or pamphlets to trim them by piling them together in as deep a pile as is practicable, placing this pile in a paper cutting machine, bringing down a clamp upon the pile, and then operating the knife to shear off the surplus paper from the edge of the pile, this operation being performed three times for the tops, sides and bottoms of the books. This method of trimming is defective in that the books at the top of the pile are cut to a smaller size than those at the bottom by reason of the effect of the clamp which holds the pile, and which in coming down invariably draws the upper portion of the pile away from the gage. The operation is also unduly expensive by reason of the numerous manipulations necessary, whereby the labor cost is rendered considerable.

The object of our invention is to produce a machine into which the books may be fed one by one, and which will automatically trim the books to exact size, and deliver the trimmed books out of the machine. By cutting the books one at a time, no appreciable difference is made in the size to which the books are cut, and by feeding them to the cutting or trimming mechanism automatically they are cut in rapid succession and the expense of trimming is thereby greatly reduced.

Our invention therefore consists broadly in the combination with automatic trimming mechanism of feeding mechanism adapted to carry the books successively to the trimming mechanism. By preference the feeding mechanism also delivers the trimmed books from the trimming mechanism. The trimming mechanism may consist of any suitable or known means for trimming off the surplus paper from the edges of the books or pamphlets, and for holding them properly in place during such trimming, the preferred construction consisting of clamping devices between which the book is firmly clamped, and cutting knives for trimming off the paper. Preferably the cutting knives cut against a cutting block, and preferably also this cutting block forms one of the clamping elements, the book being clamped against this block by a plate or table movable relatively thereto. The three cuts necessary to completely trim a book may be made simultaneously or successively. If made successively they may be made with the same knife or by different knives. And the successive cuts may be made either while the book is held by the same clamping devices, or distinct clamping devices may be employed for holding the book during the successive cuts. Preferably the cutting mechanism is divided into primary and secondary cutting mechanisms, the former comprising clamping devices and a knife for making the first cut, and the latter comprising distinct clamping devices to which the book is fed after making the first cut and a knife or knives for making the second or second and third cuts. The feeding mechanism might consist of any of the many known types or varieties of feeding mechanism used in the arts for feeding forward successive pieces of work to be operated upon, it being only essential that the feeding mechanism shall be adapted to engage books supplied to the machine and feed them one after another to the trimming mechanism. Preferably a feed table is provided on which the operator lays the books one after another, and the feeding mechanism consists of a conveyer provided with two endless traveling sections and with means for engaging the books, which means is preferably a succession of traveling bars or pushers which successively encounter the books and push them along until they are successively brought into proper position to be acted upon by the trimming mechanism. In the preferred construction the feeding mechanism consists of an endless chain or chains carrying successive cross-bars or pushers or other equivalent instrumentalities for engaging the books and pushing or feeding them along to the trimming mechanism. The preferred construction of this chain feed is that of a ladder chain, that is to say, a chain-like structure consisting of two parallel chains or sections with transverse bars connecting them and carried by them, these parts constituting the pushers above referred to. Such ladder chain is made as an endless chain, is mounted on suitable guides, and is propelled intermittently the distance from one cross-bar to the next by means of a driving mechanism engaging it. During the feeding movements of the chain the book clamps are separated and the cross-bars of the chain move between them, pushing the books to the successive positions required. After each feeding movement and during the period of rest of the chain, the clamps close upon the books and the knives act to trim them, whereupon the knives recede and the clamps separate ready for the next forward movement of the chain. Thus the one feeding mechanism feeds each book in succession first to the primary trimming mechanism, second from that to the secondary trimming mechanism, and finally from the latter it delivers the book out of the machine. Where three cuts are to be made there might be three cutting mechanisms, one cut being made by each mechanism.

Figure 2:
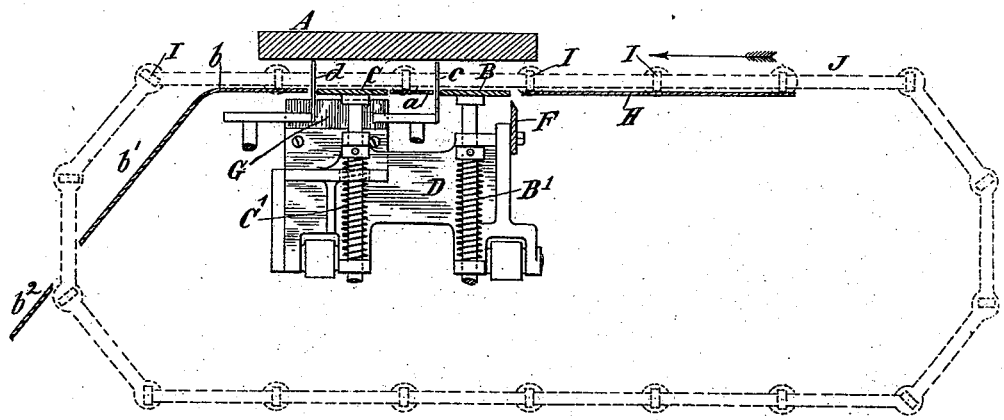
Figure 3:
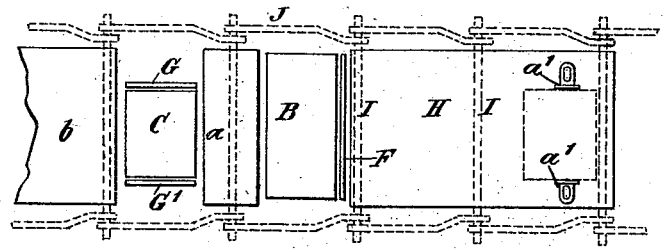

Having thus indicated the essential features and general construction and operation of our improved apparatus, we will now proceed to describe in detail the preferred construction thereof, referring for that purpose to the accompanying drawings, wherein, Figure 1 is a side view of a book to be trimmed, the dotted lines illustrating the respective trimming cuts; Fig. 2 is a diagrammatic vertical sectional view illustrating the principal operative parts of the machine; Fig. 3 is a similar diagrammatic view showing the principal operative parts in plan; Fig. 4 is a vertical longitudinal section of the machine, being chiefly a mid-section; Fig. 5 is a plan of the machine partly in section on the line 5—5 in Fig. 4, the cutting bed being accordingly removed. The feed table is also shown broken away, and the cross-bars of the feed chain also partly broken away; Fig. 6 is a vertical transverse section on the line 6—6 in Figs. 4 and 5; Fig. 7 is a side elevation of the main sliding frame with its attached parts removed from the machine, with the driving shaft and cams for driving it; Fig. 8 is a plan of said frame and its attached parts; Fig. 9 is a transverse section of the machine cut in the plane of the line 9—9 in Figs. 4 and 5; Fig. 10 is a rear elevation, and Fig. 11 a side elevation of the book-gage pertaining to the secondary trimming mechanism; Figs. 12 and 13 are corresponding views of the book-gage pertaining to the primary trimming mechanism; Fig. 14 is a transverse section cut in the plane of the line 14—14 in Figs. 4 and 5; Fig. 15 is a fragmentary plan showing the mounting of the cutting block, the view being partly broken away in horizontal section; Fig. 16 is a fragmentary side elevation illustrating the mounting of the cutting block and the mechanism for rotating it; Fig. 17 is a fragmentary horizontal section illustrating part of said latter mechanism; Figs. 18, 19 and 20 are fragmentary vertical longitudinal sections illustrating seccessive stages in the operation of the primary trimming mechanism; Fig. 21 is a similar view showing the operation of feeding the books from the primary to the secondary trimming mechanism, and from the latter to the discharge end of the machine; Fig. 22 is a fragmentary transverse section illustrating the operation of the end guides pertaining to the secondary trimming mechanism; Fig. 23 is a side elevation of one of these guides.

We will first describe in general the trimming operation as illustrated in Figs. 1, 2 and 3. The machine constructed as illustrated in the drawings is adapted to trim the book by two operations, making first a cut on the line $x-x$ in Fig. 1, and afterward two cuts simultaneously on the lines $y-y$ and $z-z$ in Fig. 1. Sometimes in book or magazine work the top cut $y$ or the bottom cut $z$ is omitted, but in the following description we shall assume that all three cuts are made.

Referring to Fig. 2, A designates a cutting bed, and B and C two spring mounted clamping plates or tables adapted to move up against the bed A. These tables are mounted on a frame D, which by suitable cams is given at intervals an upward movement sufficient to thrust the plates B and C against the under side of the cutting bed. To the frame D are fixed a knife F for making the first cut $x\ x$, and two knives G G' for making the secondary cuts $y\ y$ and $z\ z$. The arrangement of the clamping plates B C, and the knives F, G G' is best shown in Fig. 3. The clamping plates B C are mounted on the frame D through the medium of springs, so that as the frame ascends these plates are stopped by encountering the cutting bed A, whereupon the continued ascent of the frame D brings the knives F, G G' against the cutting bed.

The books to be trimmed are placed one after another on a feed table H, between the cross-bars, pushers or feeders I I of the feeding mechanism, which consists in this construction of a ladder-chain comprising the cross-bars I I and parallel endless chains J J. The cross-bars I I slide over the feed-table H, the clamping plates B and C, and fixed tables or guides $a$ and $b$, all of which when the plates B C are lowered are approximately on the same level, so that by the motion of the chains the cross-bars or pushers I I serve to push or slide the books fed on the table H along over this table, first onto the clamping plate B, subsequently from this plate over the fixed plate $a$ onto the clamping plate C, and finally from the latter over the fixed delivery plate $b$ to slide them out of the machine. The operation of trimming then is, that a book laid by the attendant on the feed table H is first pushed by one of the cross-bars I onto the feed plate B until the advancing side or back of the book encounters and is stopped by a primary gage $c$. Thereupon the frame D rises, the book being lifted on the table B until its upper side encounters the cutting bed A, whereupon it is clamped against this bed between the parallel surfaces of the bed and clamping plate, and is held with a strength dependent on the tension of a spring B' on which the clamping plate B is mounted, which spring is made quite stiff. The continued motion of the sliding frame D after the arrest of the clamping plate B, causes the primary cutting knife F to rise until its edge projects above the top of the clamping plate B and cuts through the edge of the book projecting beyond this cutting plate, until the edge of the knife reaches the lower face of the cutting bed A. Thereupon the frame D descends to its first position, the plate B following it down and lowering the partly trimmed book to its original level. At the same time the gage $c$ descends to below the level of the table H, and plates B C, to permit the cross-bar I to push the book forward over the plate $a$ and onto the secondary clamping plate C. As soon as the book and cross-bar have passed over the gage $c$, it ascends to the position shown ready to receive the next book. The book pushed onto the table C is pushed against a secondary gage $d$, which has the same movements as the gage $c$, moving synchronously therewith. The upward movement of the frame D is then repeated, the book being lifted on the clamping plate C and clamped against the cutting bed A, the plate C being arrested and exerting a clamping pressure proportional to the stiffness of its spring C', while by the continued upward movement of the frame D the knives G G' carried thereby ascend and trim off the opposite ends of the book until their edges encounter the under side of the cutting bed A, whereupon the frame D moves down again, lowering the clamping plate C to its former level. With the descent of the plate C, the secondary gage $d$ descends to below this level, and the chain thereupon moves forward again, the cross-bar I pushing the trimmed book over the plate C and onto the delivery plate $b$, down the inclined portion of which the book slides and falls out of the machine into any suitable receptacle. The books are thus trimmed one by one and in rapid succession, the speed of the machine being in fact limited only by the expertness of the operator in feeding the books to be trimmed onto the feeding table between the successive advancing movements of the chain. The books are fed against suitable gages $a'$ $a'$ (Fig. 3) on this table, and the action of the chain feeding mechanism in pushing them forward to the trimming mechanisms is to move them without lateral displacement, which with the gages $c$ and $d$, and other guiding gages hereinafter to be described, insures the accurate trimming of the books so that they are cut to exactly uniform size.

The general operation of this machine being now understood, we will proceed to describe the details of its construction.

Referring to Figs. 4, 5, 6, &c., let K K designate two parallel longitudinal side frames which constitute with their connecting cross-frames K', K², K³ the fixed frame of the machine. The side frames K K are formed with flanges constituting the ways $e$ $e$ upon which travel anti-friction rollers $f$ $f$ pivoted to the successive links of the chains J J, in order to reduce the friction of the travel of these chains. The ways $e$ $e$ extend around the ends of the frames K K as shown in Fig. 4. The construction of ladder chain shown consists of longitudinal links at the sides connected to the opposite ends of the cross-bars or feeding pushers I I, on the ends of which the anti-friction rollers $f$ $f$ are pivoted.

The vertical sliding frame D, which is shown removed from the machine in Figs. 7 and 8, is constructed with a central longitudinal web $g$, a vertical transverse web $h$ at its rear end, and a horizontal transverse table $i$ near its front end. It is guided to move vertically by the front side $g'$ of its web $g$, and the side edges $h'$ $h'$ of its transverse web $h$ working in vertical grooves or slideways formed respectively on the inner sides of the frames K' K K, as indicated in dotted lines in Fig. 8. At the lower part of the frame D are mounted rollers $j$ $j$ which rest upon cams $k$ $k$ fixed on a driving shaft L. These cams are of the shape shown in Fig. 6, so that by the rotation of the shaft L the frame D is intermittently raised and lowered, being raised once to each revolution of the shaft.

The primary trimming knife F is clamped by screws $l$ $l$ against the outer face of the transverse web $h$ of the sliding frame, adjusting screws $m$ $m$ being provided for setting up the edge of the knife. The knives G and G' are in like manner fastened to sliding brackets $n$ $n$ mounted on top of the transverse table $i$, and fastened thereto by bolts $n'$ passing through slots $n^2$ in said table, whereby the knives G G' may be set to different distances apart.

The clamping plates B and C are each mounted on two vertical bars or posts B² B² and C² C² respectively, (Fig. 7) which pass through ears formed on the slide D. Each bar has fixed to it a collar $o$, beneath which are stiff springs B' and C' respectively reacting against the lower lugs and pressing upwardly against the collars $o$, so that the plates B C are normally pressed up with these collars snug against the upper guiding lugs, as shown.

The primary cutting gage $c$ and its sliding frame or mounting are shown detached in Figs. 12 and 13. The gage $c$ consists of an upright plate which is attached by screws to an adjustable plate $c'$, mounted to slide in longitudinal direction on a plate $c^2$, which is mounted on two upright sliding posts $c^3$, the lower ends of which are connected by a crosshead $c^4$ carrying a roller $c^5$ which rests on a cam $c^6$ carried on the driving shaft L. The vertical posts $c^3$ slide through ears $g^2 g^2$ formed on the sliding frame D, as shown in Figs. 7 and 8, whereby the gage $c$ is supported and held in place. As the knife F cuts against the rear edge of the clamping plate B, the gage $c$ is adjustable toward and from the front edge of said plate in order to bring it to proper distance from the knife to determine the width to which the book is to be trimmed. It is to effect this adjustment that the sliding connection $c'$ $c^2$ is provided. An adjusting screw $c^7$ is carried by one of the sliding parts and engages female threads in the other to propel the gage in either direction for setting it.

The secondary gage $d$ and the sliding frame or mounting carrying it are shown in Figs. 10 and 11. The gage consists of a metal plate fastened to an adjustable plate $d'$ having a suitable sliding connection with a plate $d^2$ carried on vertical sliding posts $d^3$, the lower ends of which are connected by a crosshead on which is mounted a roller $d^5$ which rests on a cam $d^6$ fixed on the driving shaft L. The cross-bars I of the chain in feeding the books from the primary to the secondary trimming mechanism, bring the trimmed side edge thereof to a position flush with the rear edge of the clamping plate C, and in order to adapt the machine for books of different widths, it is essential that the gage $d$ shall be set off a distance from this point equal to the width of the book after trimming, for which purpose the gage $d$ is made longitudinally adjustable by means of the sliding connection of the plates $d'$ $d^2$, the former plate being propelled to the proper position over the latter by the action of an adjusting screw $d^7$ mounted on one of the plates and engaging threads in the other. The upright posts $d^3$ slide through lugs $d^8$ formed on the cross frame K', as shown in Fig. 9, and the two gages $c$ and $d$ are caused to descend simultaneously at intervals, that is to say, after each cutting operation and while the slide D is descending, in order to bring them below the line of travel of the feed bars I I, so that the books may be fed over them by these bars. They are shown in Fig. 21 dropped down to the positions which they occupy during this feeding movement. The cams $c^6$ $d^6$ impart the necessary rising and falling movements to the sliding frames carrying these gages, which being mounted to slide freely, descend by their own weight.

The knife F is made somewhat longer than the greatest length of the book that is to be trimmed, so that in making the initial cut the exact longitudinal adjustment of the book upon the clamping plate B is not material. In trimming the ends of the book, however, it is important that the book shall be longitudinally adjusted to the correct position in order that exactly the proper cut shall be taken from each end. To accomplish this I provide end guides or gages $p$ $p$ in the positions shown in Fig. 5, that is to say, standing slightly above the top of the clamping plate C, and in positions to receive between them the opposite ends of the book. The entering ends of these gages are flared outwardly in order to guide the book in between them. These gages are constructed of metal plates or bars, as shown in Figs. 22 and 23, and are mounted at their forward ends on arms $p'$, which arms are pivoted at their lower ends to sliding blocks $q$ $q$ fastened to a flange or cross-bar $q'$ on the transverse frame K'. The arms $p'$ are drawn toward each other by springs $p^2$ (Fig. 22) and are stopped by the abutment of boss $p^3$ against the block $q$. The gages $p$ $p$ should be set so that at rest they will stand slightly closer together than the length of the untrimmed books, in order that the books in being fed to them will force them apart a little and thereby insure a firm contact with the gages to bring them to exactly the proper position. Preferably one of the gages is made more yielding than the other by reason of its spring $p^2$ being made less stiff, in order that as the book is thus forced between them this more yielding gage shall yield, thus gaging the longitudinal position of the book by the position of the less yielding gage against which the book is kept pressed by the more yielding gage.

Inasmuch as the end gages $p$ $p$ stand almost directly over the cutting edges of the knives G G', it is important that these gages shall be moved out of the way of the knives before the knives in their ascent begin to cut the ends of the book. To automatically throw the gages $p$ $p$ out of the way of the knives after they have done their work of bringing the book to proper position, I provide the mechanism best shown in Fig. 22. The arms $p'$ of the respective gages are formed with inward projections $p^4$ which project over cam pieces $i'$ $i'$, which are fastened to the table $i$ of the sliding frame D in such positions that as this frame D commences to rise, and before the clamping plate C is arrested by the book coming against the under side of the cutting bed A, and consequently before the knives begin to move upwardly relatively to the plate C, these cams $i'$ shall encounter them, and by reason of their inclined surfaces force them outwardly, thereby throwing the arms $p'$ apart and forcing the gages $p$ away from the ends of the book, as shown in Fig. 22. In order to provide for the adjustment of the machine to trim books of different lengths, the end gages $p$ $p$ are made adjustable toward and from each other to different positions. To this end the sliding blocks $q$ $q$ to which the gage-carrying arms are pivoted are made adjustable to different points along the cross-bar $q'$. This cross-bar is formed with longitudinal slots through which pass fastening screws $q^2$ screwing into the blocks $q$. The blocks $q$ are slid toward or from each other to bring the gages to the proper positions, and the screws $q^2$ thereupon tightened. Inasmuch as the gages $p\ p$ project into the path of travel of the cross-bars or pushers I of the feed chain, these bars are cut out at their under sides, as shown at I' I', the cut away portions extending for a distance allowing for the greatest adjustment of the gages $p\ p$ to accommodate different lengths of books.

The movements of the feeding chain are imparted by the following described mechanism. On the driving shaft L is fixed a cam $r$ (Figs. 4 and 14) which acts against a roller $r'$ beneath it mounted on an arm M' fixed to a rock-shaft $M^2$ extending transversely of the machine, and having bearings in the side frames thereof, to which shaft are fixed two parallel arms M M projecting upwardly near the opposite sides, and having pivoted to their upper ends spring dogs or pawls $M^3$ the free ends of which are formed with abrupt faces adapted to engage the cross-bars I I of the chain. The two-armed elbow-lever $M^2$ M' is retracted by springs $s\ s$ connecting to the arms M M so as to keep the roller $r'$ continually pressed against the cam. The dogs $M^3$ are pressed upward by springs $s'$ pulling against the short arms of the dogs and reacting against the lever arms M. As the cam $r$ exerts its thrust against the roller, it throws the elbow-lever to the position shown in dotted lines in Fig. 4, so that the dogs $M^3$ push the cross-bar I which they are engaging forward to the position previously occupied by the bar in advance. Subsequently the cam permits the dogs to be retracted by the springs $s\ s$ until the ends of the dogs wipe under the next succeeding cross-bar and spring up against the rear side thereof ready to push it forward at the next feeding movement. After each forward feeding movement of the chain to push the books into position to be acted on by the respective trimming mechanisms, it is necessary to move the chain backward a little in order that its cross-bars I shall not stand in the way of the operation of the respective trimming knives. For example, the forward feeding movement will bring the bar I to about the position shown in Fig. 18, where it would stand in the path of and interfere with the ascent of the knife F. The next bar in advance would also stand too close to the rear ends of the knives G G'. It is accordingly desirable to move the chain backward a short distance before the cutting operation is performed. This is done by means of cams $t\ t$ carried by the sliding frame D in the positions most clearly shown in Figs. 7 and 8. The upper rear faces of these cams are inclined so as to engage the cross-bar I and push it back to the position shown in Fig. 19, the bar being thus displaced in advance of the movement of the knife F, as clearly shown.

The delivery table or slide B is extended beyond the clamping plate C, and substantially on a level therewith for a sufficient distance to clear the frame supporting the gage $d$, whereupon it descends as shown at $b'$ in Fig. 4, to discharge the bound book out at the end of the machine, terminating inside the path of the chain, and being continued outside the path of the chain by a supplemental inclined delivery plate $b^2$, from which the books may fall into any suitable receptacle.

The cutting bed A is constructed preferably with a soft or yielding under surface against which the edges of the knives may cut. This is effected preferably by providing the cutting bed on its under side with a cutting block $u$ made of wood with its grain extending vertically so that the knives cut against the end of the grain. In the construction shown this block $u$ is fitted against the under side of a disk $v$, which disk is mounted against the bottom of the bed plate $w$ of the cutting bed or head A, as shown in Figs. 4, 6 and 15. The bed plate $w$ is rigidly mounted and the disk $v$ is pivotally connected to it on a stud $v'$. The cutting block $u$ is fastened to the disk $v$ by means of straps or flanges $u'$. These straps are fastened to the disk at intervals by bolts $u^2$, and their ends are drawn together to clamp the block by bolts $u^3$.

An important feature of our invention consists in the construction of the cutting bed or block A to revolve, turning a slight distance after each cut in order to bring the next succeeding cut in a different place against the wood, and thereby prevent the formation of permanent indentations in the wood by the knife edges, such as would result in case the knives cut continually in the same place, and the effect of which would be to cut the books imperfectly, making a ragged cut, and not cutting entirely through. But by slightly turning the cutting block after each cut, the next cut is made in a different place and against whole wood, and the wood indented by the preceding cut is given time to swell and close up the indentation before, in the course of the travel of the block, the knife again cuts against it in the same place.

In practice, the machine is proportioned so that each knife makes two hundred cuts before it again reaches the same position against the block. In order to thus rotate the block, we provide the disk $v$ with peripheral gear-teeth with which meshes a pinion Q' fixed on a vertical shaft Q, as shown in Figs. 15 and 16. Lower down on this shaft is fixed a ratchet-wheel $Q^2$, while a swinging arm $Q^3$ turns loosely on the shaft and carries a pawl $q^3$, best shown in Fig. 17, meshing with said ratchet wheel. The arm $Q^2$ is vibrated by being connected through the medium of a rod $q^4$ with one of the rock-levers M of the chain feed, so that during the forward or feeding movement of the chain, the pawl $q^3$ in its forward movement propels the ratchet-wheel $q^2$, and the cutting block is consequently turned a short distance forward.

It is desirable to be able to readily remove the cutting bed from its normal position in order to be able to get at the cutting block to examine or replace it, and in order also to get access to the clamping plates B and C, gages $c$ and $d$, gages $p$ $p$, and knives F, G and G'. To provide for readily and conveniently accomplishing this, we mount the bed plate $w$ pivotally so that the cutting bed may be swung around from the position shown in full lines in Fig. 15 to that shown in dotted lines. To this end the bed plate is formed with a hub or boss $w'$ at one corner which is fixedly attached to a vertical shaft R having bearings in one of the side frames, so that this shaft may oscillate as the plate is swung around. The diagonally opposite corner of the plate is formed with an open eye or hook $w^2$, which when the plate is in place engages the end of a fixed upright shaft or post R' mounted on the opposite side of the machine. A nut $r^2$ (Fig. 4) is screwed down upon this post in order to resist the upward thrust against the cutting head. In this manner the two diagonally opposite corners of the plate $w$ are supported. The remaining corners of the plate are formed with open or slotted eyes $w^3$, and when in place pivoted rods or bars $R^3$, each hinged as shown in Fig. 6 to one of the side frames of the machine, are swung up, entering the open sides of the eyes, and have nuts $r^3$ screwed on their upper ends and bearing down upon the eyes of the bed plate. The bed plate is thus firmly mounted at all four corners, and so strongly connected as to resist the upward thrust due to the clamping and cutting operations.

The main shaft or driving shaft L of the machine is in the construction shown provided with a sprocket-wheel L' in order to be driven by an endless chain. Or it may be driven by a belt on pulleys on a counter-shaft $L^2$, shown in dotted lines in Fig. 5, this counter-shaft transmitting the motion to shaft L by bevel-gears, as shown in dotted lines at $m'$.

It must not be inferred from the particularity of detail with which we have hereinbefore described the preferred construction of our machine herewith illustrated that our invention is by any means limited in its application to the details of construction shown. Our invention is in fact susceptible of considerable modification without departing from its essential features.

In the machine illustrated and hereinbefore described, the trimming mechanism consists of the knives F, G G', the cutting bed or other part against which these knives act, and clamping devices for holding the books fast while the knives are trimming them. These clamping devices in the construction shown consist of the clamping plates B and C, and the cutting bed A against which they clamp the books. The trimming mechanism as a whole is in this machine subdivided into a primary and secondary trimming mechanism. The primary trimming mechanism comprises the primary clamping plate B and cutting knife F, and the portion of the cutting bed or block against which this clamping plate and knife act. The secondary trimming mechanism comprises the secondary clamping plate C and knives G G' and the portion of the cutting bed or block against which this plate and these knives act. All that is essential to the clamping devices is, that they shall act to clamp the book between opposite parallel surfaces. Either of these surfaces may be the movable member of the clamp by which the book is carried against the opposite surface. The lifting of the books against the cutting bed or block is not broadly essential or necessary. Nor is it essential that the cutting shall be performed by the ascending of the respective knives against the cutting bed or block, since the contrary movement may be substituted with equivalent effect. Nor is the cutting device of a knife cutting against a cutting block in itself essential to our invention, since in lieu thereof any equivalent arrangement of knives or shears such as is well known in the art of paper cutting may be substituted therefor.

In the machine shown the feeding mechanism consists of the endless ladder chain with its cross-bars or pushers I I, and the driving mechanism for actuating this feeding mechanism consists of the dogs $M^3$ and vibrating elbow-levers M, $M^2$, M', and the cam movement for vibrating these levers. But this specific feed mechanism, and this specific driving mechanism are not in themselves essential to our invention in its broader sense. The only parts of the feed mechanism which are essential, are the traveling bars or pushers I I which immediately engage the books, and which may be driven or advanced to perform the successive feeding movements by any suitable mechanical construction. These pushing bars might be substituted by any other equivalent parts which are equally adapted to engage and propel the books.

It is not strictly essential to our invention in its broadest sense that the feed mechanism should comprise a succession of feeding elements or pushers following one another continuously, since the several feeding movements might be effected by separately reciprocating feeders constituting subdivisions of the feed mechanism as a whole. Thus instead of one feeder feeding the book first to the primary trimming mechanism, thence to the secondary trimming mechanism, and finally delivering it out of the machine, one feeder might be provided for feeding the books to the primary trimming mechanism, a second feeder for feeding them thence to the secondary trimming mechanism, and a third feeder for feeding them out of the machine.

Those features which we believe to be essential to our invention are hereinafter defined in the claims.

In our patent for a book binding and covering machine No. 476,208, dated May 31, 1892, we have shown in Figs. 26, 27 and 28 a trimming knife for slicing off the back of the book as the initial step of the operation of binding the book, the book back thus sliced being subsequently coated with glue, and a fibrous material applied thereto as a means for holding the leaves together, in lieu of stitching or other means of book binding. This back cutting knife is accordingly in no proper sense a book trimmer, since the book after being bound together by the machine described in said patent still requires to be trimmed on its side and end edges. By a book trimming or cutting machine in the sense herein employed we mean one which trims the side edge and one or both of the end edges of the book.

We claim as our invention the novel features and combinations hereinafter defined, each substantially as hereinbefore specified, namely:—

1. In a book-trimming machine, the combination of a book-clamp comprising two members relatively movable to clamp a single book between them, a trimming knife arranged to trim off one edge of a book while held by said clamp, mechanism for intermittently closing said clamp actuating said knife and opening said clamp, and a book-feeding mechanism movable relatively to said clamp and adapted to engage successive books and transfer them one by one from a receiving position outside of said clamp between the members of said clamp flatwise into position to be clamped and trimmed.

2. In a book-trimming machine, the combination of a book-clamp comprising two members relatively movable to clamp a single book between them, a trimming knife arranged to trim off one edge of a book while held by said clamp, mechanism for intermittently closing said clamp actuating said knife and opening said clamp, a book-receiving table upon which the books to be trimmed are received, and a book-feeding mechanism movable relatively to said clamp and adapted to engage successive books and transfer them one by one from a receiving position on said table to a position flatwise between the members of said clamp ready to be clamped and trimmed.

3. The combination with automatic trimming mechanism comprising clamping devices for clamping fast the book to be trimmed and knives for trimming its side and end edges, of feeding mechanism adapted to carry the books to be trimmed successively into position to be acted on by said trimming mechanism, and also subsequently to feed the trimmed books from the trimming mechanism.

4. The combination with primary and secondary trimming mechanisms adapted to make successive cuts at right angles to each other for trimming a book, of a feeding mechanism for transferring the partly trimmed book from the primary to the secondary trimming mechanism.

5. The combination with primary and secondary trimming mechanisms adapted to make successive cuts at right angles to each other for trimming a book, of feeding mechanism for carrying the books to be trimmed in succession first to the primary and then to the secondary trimming mechanisms.

6. In a book-trimming machine, a book-clamp comprising two members relatively movable to clamp a single book between them, knives for trimming off the side and end edges of a book while held by said clamp, and mechanism for intermittently closing said clamp actuating said knives and opening said clamp, in combination with a feeding mechanism movable relatively to said clamp and consisting of an endless traveling chain or conveyer provided at intervals with means for engaging books whereby successive books are carried one by one in turn to the trimming mechanism.

7. In a book-trimming machine, a trimming mechanism, in combination with a feeding mechanism comprising a conveyer having two endless traveling sections which travel on opposite sides and outside of the trimming mechanism and which are provided with means for engaging books and carrying them to the trimming mechanism.

8. The combination with trimming mechanism of a feeding mechanism consisting of a ladder chain with its links running on opposite sides of the trimming mechanism, and cross-bars extending between, the links, said cross-bars adapted to push the books before them to the trimming mechanism.

9. The combination of an intermittently operating trimming mechanism comprising clamping devices for clamping a book and knives for trimming its edges, an intermittently advancing feeding mechanism adapted to carry the books to be trimmed successively into position to be acted on by the trimming mechanism, and a driving mechanism adapted to actuate alternately the feeding mechanism and the trimming mechanism, whereby the books are first fed to the trimming mechanism, then engaged and clamped and trimmed by the latter and then released and again fed forward.

10. The combination of an intermittently acting trimming mechanism comprising opposite clamping devices for holding the book between them, constructed to open and close intermittently and knives for trimming the book, constructed to act while the clamping devices are closed of a feeding mechanism comprising bars or pushers movable intermittently between said clamping devices while the latter are open during the periods of rest of the trimming mechanism.

11. The combination of an intermittently acting trimming mechanism comprising clamping devices for holding the book and knives for trimming it, a feeding mechanism comprising feed bars or pushers movable between the clamping devices, and adapted to carry the books to be trimmed into position to be grasped by the clamping devices, a stop-gage for insuring the correct position of the book, and means for moving this gage out of the path of said feed bars upon the opening of the clamping devices after the trimming operation.

12. The combination of a trimming mechanism comprising clamping devices between which the book is clamped and knives for trimming the book, a feeding mechanism adapted to move the books sidewise to the trimming mechanism into position to be grasped by the clamping devices, movable end gages for insuring the correct position of the book relatively to the end trimming knives consisting of longitudinal bars between which the book passes as it is fed between said clamping devices, and mechanism for moving said gages out of the way of the knives.

13. The combination of a trimming mechanism comprising clamping devices between which the book is clamped and knives for trimming the book, a feeding mechanism adapted to move the books sidewise to the trimming mechanism into position to be grasped by the clamping devices, and end gages for insuring the correct position of the book relatively to the end trimming knives consisting of bars adapted to grasp the ends of the book between them as it is fed to the clamping devices, mounted on pivoted arms and having mechanism for moving the arms toward and from each other.

14. A trimming mechanism comprising a cutting bed, a knife-carrying frame, said frame and bed being movable relatively to one another to bring the knives against the bed, primary and secondary clamping devices comprising two spring seated clamping plates arranged adjacent to the respective knives and adapted to clamp the books against said cutting bed, combined with a feeding mechanism comprising feed bars or pushers movable intermittently between said clamping plates and bed to carry the books to be trimmed successively first into position to be grasped by the primary clamping plate for making the first cut, and subsequently into position to be grasped by the secondary clamping plate for making the second cut.

15. The combination to form a book trimming mechanism of a cutting bed or block, a clamp for clamping the book against said bed, a trimming knife, and a frame carrying said knife, said bed and knife frame being movable relatively to one another to cause the knife to cut against the bed, and said bed being mounted rotatively to permit it to be moved to bring new surfaces into position to receive the cutting action of the knife.

16. The combination to form a book trimming mechanism of a cutting bed or block, a clamp for clamping the book against said bed, a trimming knife, a frame carrying said knife, said bed and knife frame being movable relatively to one another to cause the knife to cut against the bed, and a mechanism for intermittently rotating said bed to cause the successive knife cuts to come in different places on its surface.

17. The combination of trimming mechanism comprising a cutting bed or block mounted rotatively, clamping devices and cutting knives movable against said bed, a feeding mechanism adapted to carry the books to be trimmed successively into position to be acted on by said trimming mechanism, and driving mechanism adapted to intermittently operate the trimming mechanism and alternatively therewith to operate the feeding mechanism and a mechanism driven therefrom to impart successive rotative movements to said cutting bed.

18. In a trimming mechanism, the combination of an overhead cutting bed with trimming knives acting against it from beneath, said bed being pivotally mounted at one side in order that it may be disconnected and swung out of place to give access to said knives.

19. The combination of side frames K K, cutting bed A mounted over said frames, a post R on which said bed is pivoted so that it may be swung over said frames, and posts R' R³ adapted to be separably connected to said bed when the latter is in place.

20. The combination with an endless feed-chain J of a driving mechanism therefor consisting of a vibrating arm M, a spring actuated dog M³ carried thereby and adapted to engage the successive links of the chain, a driving shaft, and interposed mechanism for vibrating said arm M to alternately exert a pushing thrust against the chain through said dog and to retract said dog.

21. The combination with endless chain J of a driving mechanism for intermittently propelling it consisting of pivoted dog M³, rock lever M, M², M', driving shaft L, and cam $r$ thereon acting against said lever.

22. The combination of feeding table H, clamping plate B approximately level therewith, cutting bed A above said clamping plate, knife F, frame D carrying said knife and clamping plate, a feeding mechanism for pushing a book from said feed-table over onto said clamping plate, and driving mechanism for lifting said frame D to raise the book on said plate against the cutting bed, thereby clamping it, and subsequently bringing the knife against said bed to trim the book.

23. The combination of cutting bed A, a clamping plate beneath said bed, and a vertically movable knife adjacent to said plate, a stop-gage $c$ for determining the position on said plate of the book to be trimmed, a feeding mechanism comprising cross-bars or pushers I movable between said clamping plate and cutting bed, and driving mechanism adapted to successively elevate said clamping plate and knife, to depress them, and with them to lower said gage out of the path of said feed bars, thereupon to actuate the feed mechanism, and after the passage of a feed-bar over said gage to elevate the latter into its active position.

24. In a trimming mechanism, the combination of a stop-gage $c$, a vertically sliding frame therefor comprising posts as $c^3$, a top plate $c^2$ on which said gage is longitudinally adjustable, an anti-friction roller, and a driving shaft having a cam $c^6$ acting against said roller for raising and lowering said gage.

25. In a trimming mechanism, the combination of a secondary stop-gage $d$, a sliding frame therefor comprising relatively adjustable plates $d'$ $d^2$, an adjusting screw for operating them to adjust the position of the gage, and a driving shaft having a cam $d^6$ acting against said sliding frame for protruding and retracting the gage.

26. In a trimming mechanism, the combination with clamping and cutting devices, of end gages $p$ $p$, carrying arms $p'$ $p'$ therefor, and springs $p^2$ $p^2$ adapted to yield to the outward thrust of the gages as the book enters between them.

27. In a trimming mechanism, the combination of end gages $p$ $p$, supporting arms $p'$ therefor, stops for limiting the inward movement of the gages, and springs $p^2$ acting to press the gages inwardly against said stops, one of said springs being stronger than the other in order to cause one gage to yield while the other directs the book to position.

28. In a trimming mechanism, the combination of end gages $p$ $p$, supporting arms $p'$ therefor, carrier blocks $q$ to which said arms are pivoted, supporting bar $q'$, and an adjustable connection between said blocks and bar, whereby the blocks may be adjusted to or from each other to vary the position of the gages and accommodate them to longer or shorter books.

29. In a trimming mechanism, the combination with clamping plate C and trimming knives G G' of end gages $p$ $p$ for said knives, spring-pressed arms $p'$ carrying said gages, and cam projections $i'$ in connection with said knives adapted upon the ascent of the knives to engage said arms and thrust the gages out of the way of the knives.

30. The combination of knife carrying frame D, clamping plate C, end gages $p$ $p$, spring-pressed carrying arms $p'$ therefor formed with projections $p^4$, and cam projections $i'$ carried by said slide D and adapted upon the upward movement thereof to encounter said projections $p^4$ and thrust the end guides out of the way of the knives.

31. The combination with trimming mechanism of feeding mechanism comprising cross-bars or pushers adapted to carry the books to be trimmed successively into position to be acted on by said trimming mechanism and driving mechanism for intermittently advancing said feeding mechanism, and means for subsequently slightly retracting it to bring the pushers out of the way of the trimming mechanism.

32. The combination with trimming mechanism of feeding mechanism comprising cross-bars or pushers I I, a driving mechanism acting to intermittently advance said feeding mechanism, and a retracting device carried by the trimming mechanism and acting after each feeding movement to thrust back the feeding mechanism out of the way of the trimming mechanism.

33. The combination with trimming mechanism comprising a reciprocating knife-carrying frame, of feeding mechanism comprising cross-bars or pushers I I, driving mechanism acting intermittently to advance said cross-bars or pushers, and a cam $t$ connected to said knife carrying frame and adapted to act against said cross-bars to thrust them back in advance of the action of the knife.

34. The combination with trimming mechanism comprising vertically moving knife-carrying frame D, of feeding mechanism consisting of endless ladder-chain J having cross bars I I, a driving mechanism for intermittently advancing said chain, and means for retracting said chain after each feeding movement, consisting of cam projections $t$ $t$ carried by said frame D and adapted during the upward movement thereof to engage said cross-bars and thrust them back.

In witness whereof we have hereunto signed our names in the presence of two subscribing witnesses.

CHARLES W. LOVELL.
ALFRED BREDENBERG.

Witnesses:
GEORGE H. FRASER,
FRED WHITE.